(12) United States Patent
Taalimi et al.

(10) Patent No.: US 11,585,923 B2
(45) Date of Patent: Feb. 21, 2023

(54) POINT CLOUD REGISTRATION FOR LIDAR LABELING

(71) Applicant: GM Cruise Holding LLC, San Francisco, CA (US)

(72) Inventors: Ali Taalimi, San Francisco, CA (US); Matthias Wisniowski, Vienna (AT); Jake Obron, San Francisco, CA (US); Yunjing Xu, San Francisco, CA (US); Meng-Ta Chou, Richmond, CA (US); Siddharth Raina, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 173 days.

(21) Appl. No.: 16/730,453

(22) Filed: Dec. 30, 2019

(65) Prior Publication Data
US 2021/0199799 A1    Jul. 1, 2021

(51) Int. Cl.
| | | |
|---|---|---|
| *G01S 17/06* | (2006.01) | |
| *G06N 7/00* | (2023.01) | |
| *G01S 7/48* | (2006.01) | |
| *G01S 17/89* | (2020.01) | |

(52) U.S. Cl.
CPC ............ *G01S 17/06* (2013.01); *G01S 7/4808* (2013.01); *G01S 17/89* (2013.01); *G06N 7/005* (2013.01)

(58) Field of Classification Search
CPC ........ G01S 17/06; G01S 17/89; G01S 7/4808; G06N 20/00; G06N 7/005; G06T 2207/10016; G06T 2207/10021; G06T 2207/10028; G06T 2207/10044; G06T 2207/20104; G06T 2207/30252; G06T 7/77
USPC .......................................................... 356/30
See application file for complete search history.

(56) References Cited

U.S. PATENT DOCUMENTS

| | | | | |
|---|---|---|---|---|
| 9,262,564 | B2 * | 2/2016 | Plummer | G06F 30/20 |
| 2019/0122393 | A1 * | 4/2019 | Sinharoy | G06K 9/6202 |
| 2019/0391268 | A1 * | 12/2019 | Houts | G01S 7/4808 |
| 2020/0074739 | A1 * | 3/2020 | Stauber | G06F 3/011 |
| 2020/0301799 | A1 * | 9/2020 | Manivasagam | G01S 17/931 |
| 2021/0201578 | A1 * | 7/2021 | Chaudhuri | G06T 7/246 |

\* cited by examiner

*Primary Examiner* — Sunghee Y Gray
(74) *Attorney, Agent, or Firm* — Polsinelli PC

(57) ABSTRACT

The subject disclosure relates to techniques for detecting an object. A process of the disclosed technology can include steps for receiving three-dimensional (3D) Light Detection and Ranging (LiDAR) data of the object at a first time, generating a first point cloud based on the 3D LiDAR data at the first time, receiving 3D LiDAR data of the object at a second time, generating a second point cloud based on the 3D LiDAR data at the second time, aggregating the first point cloud and the second point cloud to form an aggregated point cloud, and placing a bounding box around the aggregated point cloud. Systems and machine-readable media are also provided.

15 Claims, 4 Drawing Sheets

POINT CLOUD REGISTRATION FOR LIDAR LABELING

BACKGROUND

1. Technical Field

The subject technology provides solutions for facilitating the placement of bounding boxes around image objects and in particular, for utilizing Light Detection and Ranging (LiDAR) point clouds to provide bounding box placement recommendations.

2. Introduction

Image processing systems that are configured to perform object recognition often use bounding boxes to identify pixels corresponding with locations of objects of interest. In some conventional image processing applications, bounding box placement is performed manually, which is time consuming and expensive. In these conventional workflows, users are typically responsible for identifying object locations, and for manually drawing bounding boxes around the object edges using a cursor or other input device.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements in placement of bounding boxes around image objects. In some examples, a computer-implemented method for detecting an object can include receiving three-dimensional (3D) Light Detection and Ranging (LiDAR) data of the object at a first time. The method further can include generating a first point cloud based on the 3D LiDAR data at the first time. The method also can include receiving 3D LiDAR data of the object at a second time. The method can additionally include generating a second point cloud based on the 3D LiDAR data at the second time. The method further can include aggregating the first point cloud and the second point cloud to form an aggregated point cloud. The method also can include placing a bounding box around the aggregated point cloud.

Figure 1:
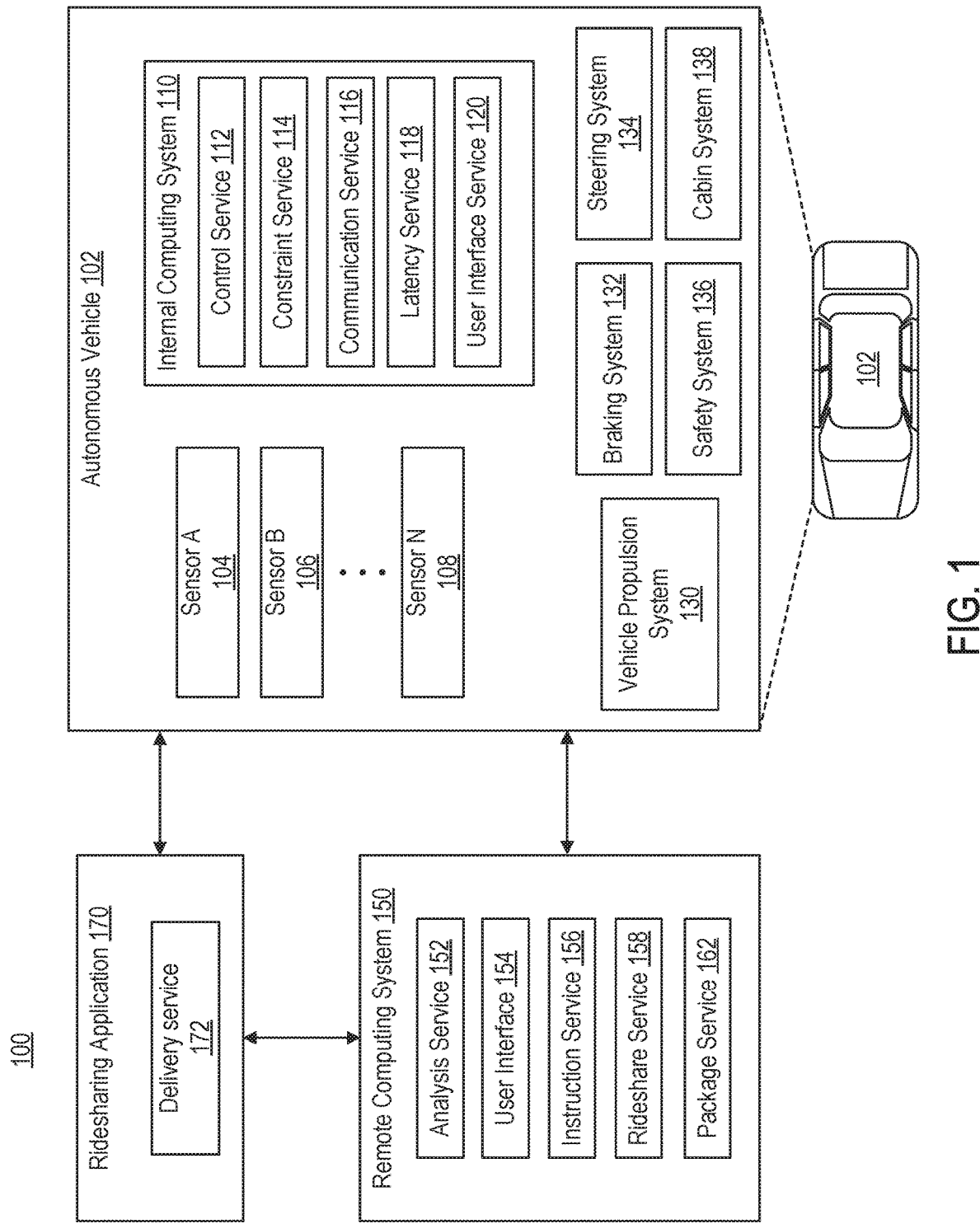
FIG. 1 illustrates an example environment that includes an autonomous vehicle in communication with a remote computing system, according to some aspects of the disclosed technology.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), 3rd Generation (3G), 5th Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
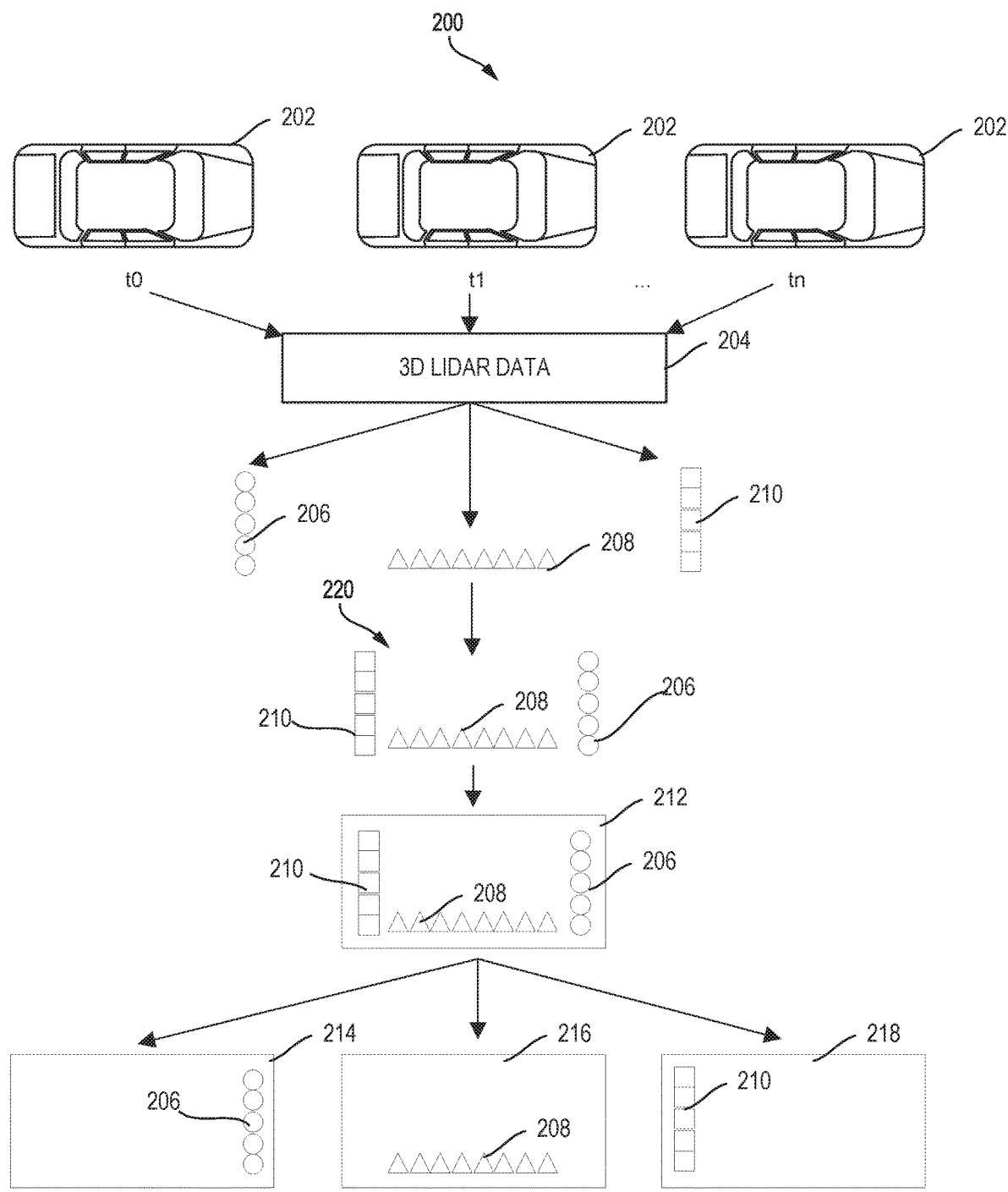
FIG. 2 illustrates an example flowchart for detecting an object, according to some aspects of the disclosed technology.

FIG. 2 illustrates an example flowchart of a system for detecting an object 200, according to some aspects of the disclosed technology. In the system 200, the object 202 (e.g., vehicles, pedestrians, signs, etc.) can be detected by utilizing Light Detection and Ranging (LiDAR) or any other radar or detection methods suitable for the intended purpose and understood by a person of ordinary skill in the art. The LiDAR 204 also can be configured to detect the object 202 as various time periods t0, t1, . . . tn.

The LiDAR data 204 received from detecting the object 202 in an environment (e.g., an intersection or road) can be utilized to generate point clouds 206, 208, 210 associated with the object 202. Point clouds 206, 208, 210 can be a subset of a point cloud representing an environment surrounding a LiDAR. The LiDAR data 204 can be indicative of points in three-dimensional space, speed, direction, or a combination thereof. For example, LiDAR data 204 can indicate both a point in three-dimensional space as well as a velocity associated with the point in three-dimensional space. FIG. 2 illustrates the point cloud 206 as circles, the point cloud 208 as triangles, and the point cloud 210 as squares, but these shapes are illustrative and can be any shape suitable for the intended purpose and understood by a person of ordinary skill in the art.

As the LiDAR 204 detects various points of the object 202, the system 200 can utilize a Gaussian mixture model (GMM) to identify regions or portions of the object 202 (i.e., determine the point clouds 206, 208, 210 of the object 202). The system 200 also can utilize a generalized iterative closest point (GICP) model to determine the position of the point clouds 206, 208, 210 that correspond to the object 202. For example, the point cloud 206 can represent a front portion of a vehicle, the point cloud 208 can represent a side portion of the vehicle, and the point cloud 210 can represent a rear portion of the vehicle.

In some cases, the system 200 also can aggregate the point clouds 206, 208, 210 as shown in FIG. 2 to form an aggregated point cloud 220. The aggregated point cloud 220 can form an outline or a plot of the object 202 such that the system 200 is able to detect and track the object 202. In some instances, a bounding box 212 can be placed around the aggregated point cloud 220 to label the aggregated point cloud 220 accordingly.

In some implementations, bounding boxes 214, 216, 218 that correspond to the bounding box 212 can be placed around each of the point clouds 206, 208, 210, respectively, as shown in FIG. 2. The bounding boxes 214, 216, 218 can be in similar size and shape of the bounding box 212 to identify the entirety of the object 202 while only displaying one of the point clouds 206, 208, 210. For example, the bounding box 214 can be placed around the point cloud 206, the bounding box 216 can be placed around the point cloud 208, and the bounding box 218 can be placed around the point cloud 210.

In some instances, the bounding boxes 214, 216, 218 can follow their corresponding point clouds 206, 208, 210, respectively, such that at future time periods, the point clouds 206, 208, 210 are labeled to continuously identify the object 202 being tracked by the system 200.

Figure 3:
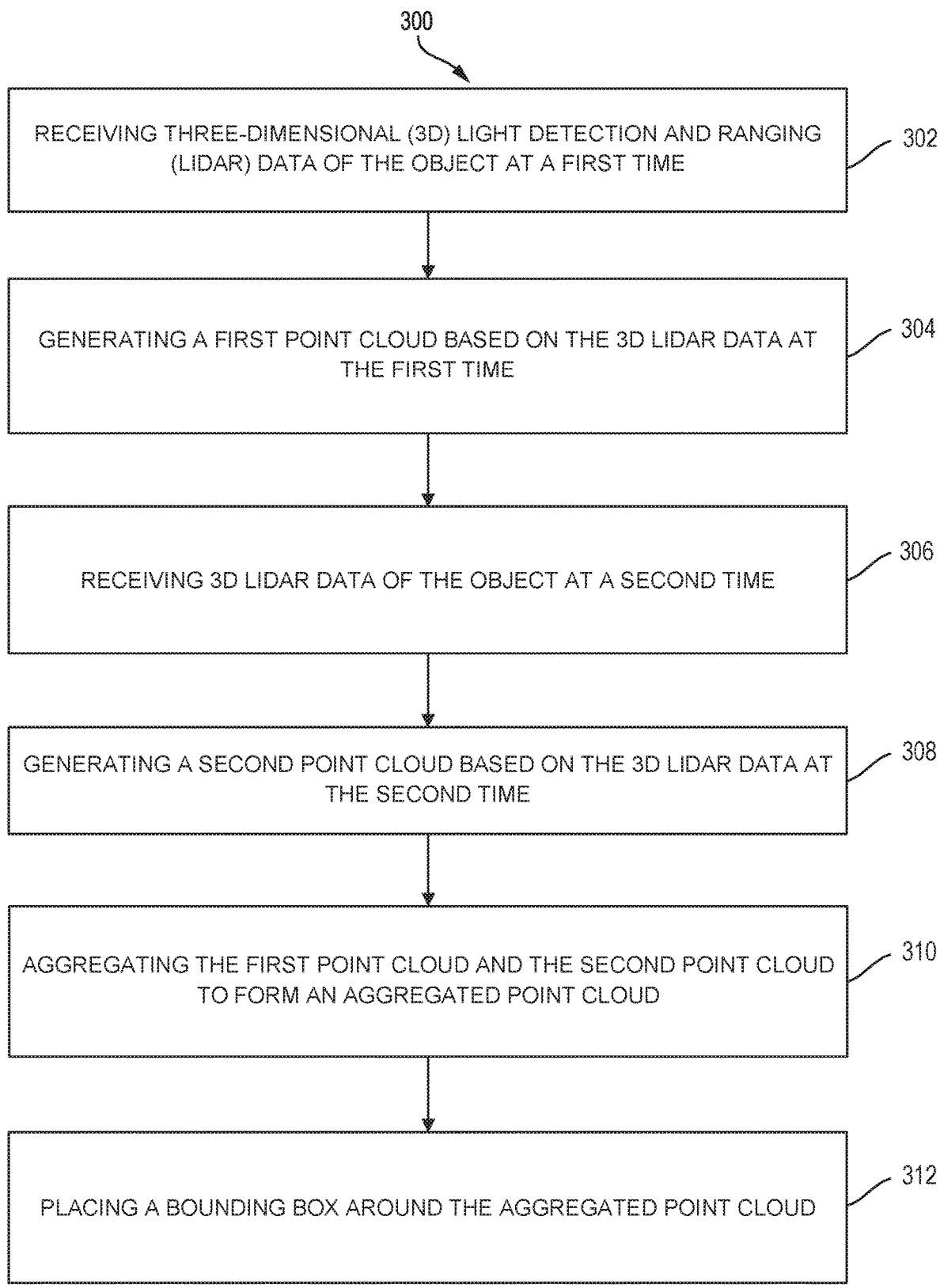
FIG. 3 illustrates an example process for detecting an object, according to some aspects of the disclosed technology.

Having disclosed some example system components and concepts, the disclosure now turns to FIG. 3, which illustrate example method 300 for adjusting an exposure setting based on a region of interest. The steps outlined herein are exemplary and can be implemented in any combination thereof, including combinations that exclude, add, or modify certain steps.

At step 302, the method 300 can include receiving three-dimensional (3D) Light Detection and Ranging (LiDAR) data associated with an object at a first time. The object can be a vehicle, a pedestrian, a sign, or any other object that can be detected by an autonomous vehicle suitable for the intended purpose and understood by a person of ordinary skill in the art. The method 300 can utilize LiDAR, stereo cameras, radar, cameras, or any other radar or detection methods suitable for the intended purpose and understood by a person of ordinary skill in the art.

At step 304, the method 300 can include generating a first point cloud based on the 3D LiDAR data at the first time. For example, the method 300 can utilize a GMM to determine the first point cloud. The method 300 also can include utilizing a GICP model to determine the first point cloud.

In some cases, at the first time, the method 300 can detect a front bumper of a vehicle and generate the first point cloud based on the data received from the LiDAR. 3D LiDAR data representing the front bumper of the vehicle can include points in three-dimensional space and corresponding velocity vectors.

At step 306, the method 300 can include receiving 3D LiDAR data of the object at a second time. For example, as the vehicle continues to proceed to a subsequent position at the second time, the LiDAR can detect a side portion/passenger side of the vehicle. 3D LiDAR data representing the side portion of the vehicle can include points in three-dimensional space and corresponding velocity vectors. Due to a trajectory of the vehicle, points, and corresponding velocity vectors associated with the side portion of the vehicle, the points and velocity vectors associated with the side portion of the vehicle may be distinct from points and velocity vectors associated with the front bumper of the vehicle.

At step 308, the method 300 can include generating a second point cloud based on the 3D LiDAR data at the second time. The second point cloud can be a subset of a point cloud representing an environment surrounding a LiDAR. The method 300 can utilize the GMM to determine the second point cloud (i.e., the side portion of the vehicle). The method 300 can include utilizing a GICP model to determine the second point cloud, similar to how the first point cloud is determined.

In some cases, the first point cloud and the second point cloud can define different portions of the object. In some cases, the first and second point cloud can define a similar portion (e.g., adjacent or overlapping portion) of the object. Pursuant to the example above, the first point cloud can be a front bumper of a vehicle and the second point cloud can be a side portion/panel of the vehicle.

At step 310, the method 300 can include aggregating the first point cloud and the second point cloud to form an aggregated point cloud. In an example where the object is a vehicle, the aggregated point cloud can represent a three-dimensional outline or a plot of the vehicle, thereby labeling the vehicle for future purposes.

At step 312, the method 300 can include placing a bounding box around the aggregated point cloud. The bounding box can be utilized at a future time and labeled accordingly to track the object/vehicle in real-time.

In some implementations, the method 300 further can include receiving a user input including an indication of whether the bounding box is accurately placed around the object/aggregated point cloud. A bounding box can be configured for display to a user. The bounding box can be selectable to cause an alteration to the bounding box. For example, the bounding box can be selectable to cause the bounding box to resize or move to another position within three-dimensional space.

In some cases, the method 300 further can include leveraging the bounding box around the aggregated point cloud to identify and label objects in other frames. Bounding boxes can be propagated back to earlier frames and/or into subsequent frames. For example, a first bounding box can be placed around only points of the first point cloud at a subsequent time, and a second bounding box can be placed around only points of the second point cloud at the subsequent time. In some instances, the first bounding box and the second bounding box can correspond to the bounding box of the aggregated point cloud (e.g., size and shape of the bounding box of the aggregated point cloud) as shown in FIG. 2. Moreover, the bounding boxes for each respective point cloud can be utilized to track each point cloud at future time periods. Each respective point cloud also can be labeled to continuously identify the object being tracked by the method 300.

Figure 4:
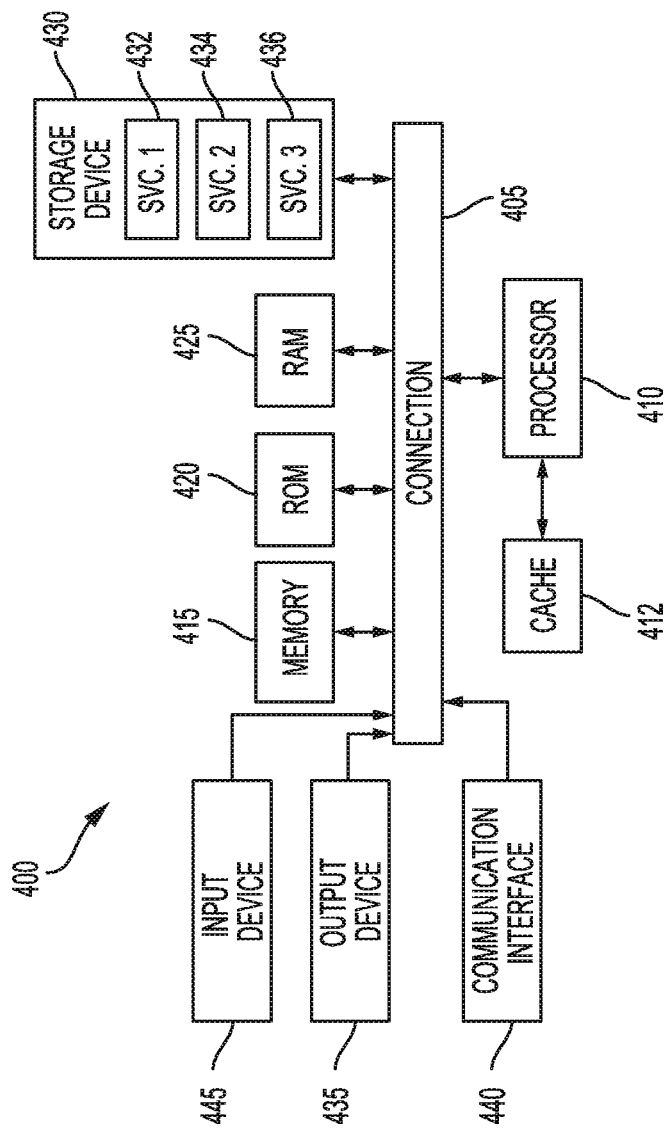
FIG. 4 illustrates an example processor-based system with which some aspects of the subject technology can be implemented.

FIG. 4 illustrates an example computing system 400 which can be, for example, any computing device making up internal computing system 110, remote computing system 150, a passenger device executing rideshare application 170, or any other computing device. In FIG. 4, the components of the computing system 400 are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method for detecting a moving object using Light Detection and Ranging (LiDAR), the method comprising:
    receiving three-dimensional (3D) Light Detection and Ranging (LiDAR) data of the object at a first time;
    identify, using a mixture model on the 3D LiDAR data, that a first set of points of the 3D LiDAR data represent a first portion of the object;
    generating a first 3D point cloud based on the 3D LiDAR data at the first time, wherein the first 3D point cloud is associated with the first portion of the object;
    receiving additional 3D LiDAR data of the object at a second time;
    identifying, using the mixture model on the additional 3D LiDAR data, that a second set of points of the additional 3D LiDAR data represent a second portion of the object;
    generating a second 3D point cloud based on the additional 3D LiDAR data at the second time, wherein the second 3D point cloud is associated with the second portion of the object;
    aggregating the first 3D point cloud and the second 3D point cloud to form an aggregated 3D point cloud associated with an entirety of the object;
    placing a bounding box around the aggregated 3D point cloud; and
    tracking the object based on the bounding box.

2. The computer-implemented method of claim 1, further comprising receiving a user input including an indication of whether the bounding box is accurately placed around the aggregated 3D point cloud.

3. The computer-implemented method of claim 1, further comprising:
    placing a first bounding box corresponding to the first 3D point cloud around only points of the first 3D point cloud at a time subsequent to the first time; and
    placing a second bounding box corresponding to the second 3D point cloud around only points of the second 3D point cloud at a time subsequent to the second time.

4. The computer-implemented method of claim 3, wherein the first bounding box and the second bounding box correspond to the bounding box of the aggregated 3D point cloud.

5. The computer-implemented method of claim 3, further comprising:
    tracking the object based on at least one of the first bounding box and the second bounding box.

6. The computer-implemented method of claim 1, further comprising:
    propagating the bounding box into earlier frames.

7. The computer-implemented method of claim 1, further comprising:
    propagating the bounding box into future frames.

8. The computer-implemented method of claim 1, further comprising:
    labeling a first bounding box corresponding to the first 3D point cloud; and
    tracking the object by continuously identifying the object based on the first bounding box.

9. A system for detecting a moving object using Light Detection and Ranging (LiDAR), the system comprising:
    one or more processors; and
    a computer-readable medium comprising instructions stored therein, which when executed by the processors, cause the processors to perform operations comprising:
    receiving three-dimensional (3D) Light Detection and Ranging (LiDAR) data of the object at a first time;
    identifying, using a mixture model on the 3D LiDAR data, that a first set of points of the 3D LiDAR data represent a first portion of the object;
    generating a first 3D point cloud based on the 3D LiDAR data at the first time, wherein the first 3D point cloud is associated with the first portion of the object;
    receiving additional 3D LiDAR data of the object at a second time;
    identifying, using the mixture model on the additional 3D LiDAR data, that a second set of points of the additional 3D LiDAR data represent a second portion of the object;
    generating a second 3D point cloud based on the additional 3D LiDAR data at the second time, wherein the second 3D point cloud is associated with the second portion of the object;

aggregating the first 3D point cloud and the second 3D point cloud to form an aggregated 3D point cloud associated with an entirety of the object;
placing a bounding box around the aggregated 3D point cloud; and
tracking the object based on the bounding box.

10. The system of claim 9, wherein the instructions stored therein, which when executed by the processors, further cause the processors to perform operations comprising receiving a user input including an indication of whether the bounding box is accurately placed around the aggregated 3D point cloud.

11. The system of claim 9, wherein the instructions stored therein, which when executed by the processors, further cause the processors to perform operations comprising:
placing a first bounding box corresponding to the first 3D point cloud around only points of the first 3D point cloud at a time subsequent to the first time; and
placing a second bounding box corresponding to the second 3D point cloud around only point of the second 3D point cloud at a time subsequent to the second time.

12. The system of claim 11, wherein the first bounding box and the second bounding box correspond to the bounding box of the aggregated 3D point cloud.

13. A non-transitory computer-readable storage medium comprising instructions stored therein, which when executed by one or more processors, cause the processors to perform operations for detecting a moving object using Light Detection and Ranging, the operations comprising:
receiving three-dimensional (3D) Light Detection and Ranging (LiDAR) data of the object at a first time;
identifying, using a mixture model on the 3D LiDAR data, that a first set of points of the 3D LiDAR data represent a first portion of the object;
generating a first 3D point cloud based on the 3D LiDAR data at the first time, wherein the first 3D point cloud is associated with the first portion of the object;
receiving additional 3D LiDAR data of the object at a second time;
identifying, using the mixture model on the additional 3D LiDAR data, that a second set of points of the additional 3D LiDAR data represent a second portion of the object;
generating a second 3D point cloud based on the additional 3D LiDAR data at the second time, wherein the second 3D point cloud is associated with the second portion of the object;
aggregating the first 3D point cloud and the second 3D point cloud to form an aggregated 3D point cloud associated with an entirety of the object;
placing a bounding box around the aggregated 3D point cloud; and
tracking the object based on the bounding box.

14. The non-transitory computer-readable storage medium of claim 13, wherein the instructions stored therein, which when executed by one or more processors, further cause the processors to perform operations comprising receiving a user input including an indication of whether the bounding box is accurately placed around the aggregated 3D point cloud.

15. The non-transitory computer-readable storage medium of claim 13, wherein the instructions stored therein, which when executed by one or more processors, further cause the processors to perform operations comprising:
placing a first bounding box corresponding to the first 3D point cloud around only points of the first 3D point cloud at a time subsequent to the first time; and
placing a second bounding box corresponding to the second 3D point cloud around only point of the second 3D point cloud at a time subsequent to the second time,
wherein the first bounding box and the second bounding box correspond to the bounding box of the aggregated 3D point cloud.

* * * * *